(12) United States Patent
Togita

(10) Patent No.: US 10,484,679 B2
(45) Date of Patent: Nov. 19, 2019

(54) IMAGE CAPTURING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Koji Togita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 15/824,390

(22) Filed: Nov. 28, 2017

(65) Prior Publication Data

US 2018/0152700 A1 May 31, 2018

(30) Foreign Application Priority Data

Nov. 29, 2016 (JP) .................................. 2016-231850

(51) Int. Cl.
*H04N 19/105* (2014.01)
*H04N 19/63* (2014.01)
*H04N 19/17* (2014.01)
*H04N 19/124* (2014.01)

(52) U.S. Cl.
CPC ......... *H04N 19/105* (2014.11); *H04N 19/124* (2014.11); *H04N 19/17* (2014.11); *H04N 19/63* (2014.11)

(58) Field of Classification Search
None
See application file for complete search history.

(56) References Cited

U.S. PATENT DOCUMENTS

| 9,462,182 B2 | 10/2016 | Togita | |
|---|---|---|---|
| 2007/0106890 A1* | 5/2007 | Kwon | G06F 21/572 713/1 |
| 2012/0314765 A1* | 12/2012 | Omori | H04N 19/115 375/240.08 |
| 2013/0343665 A1* | 12/2013 | Maeda | H04N 19/50 382/233 |

FOREIGN PATENT DOCUMENTS

JP 2011029956 A 2/2011

* cited by examiner

*Primary Examiner* — Vikkram Bali
(74) *Attorney, Agent, or Firm* — Carter, DeLuca & Farrell LLP

(57) ABSTRACT

An image capturing apparatus which generates an image by shooting a subject, calculates a parameter for image encoding, and generates encoded data by encoding the shot image using the parameter, wherein while encoded data of a first image to be encoded is generated, a first parameter is generated for encoding a second image to be encoded next based on an encoding result of a third image that has been encoded immediately before the first image, and in a period from completion of encoding of the first image to a start of encoding of the second image, one of the first parameter and a second parameter is provided as a parameter for encoding the second image based on a correlation between the first image and the third image.

14 Claims, 11 Drawing Sheets

BAYER ARRAY

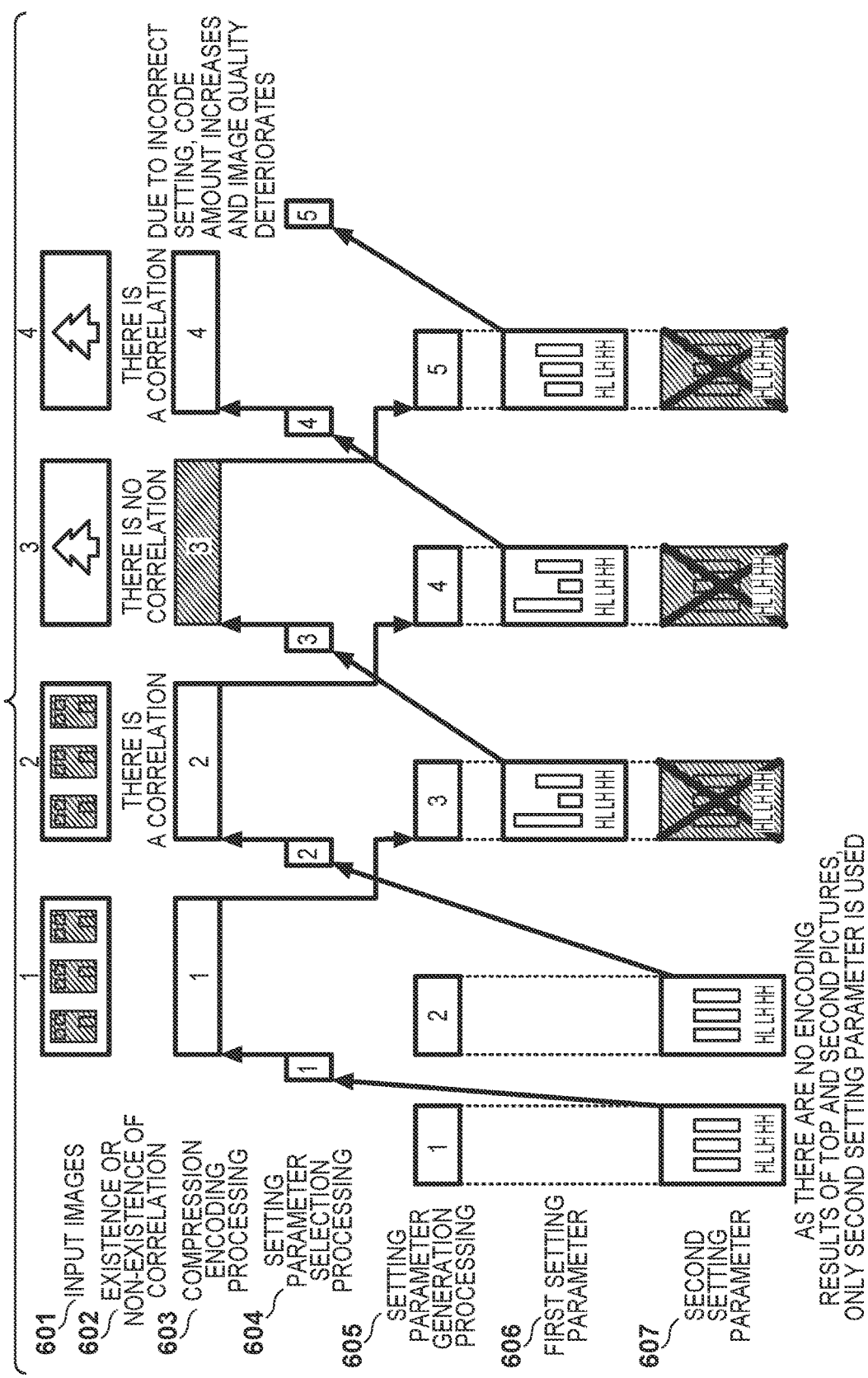

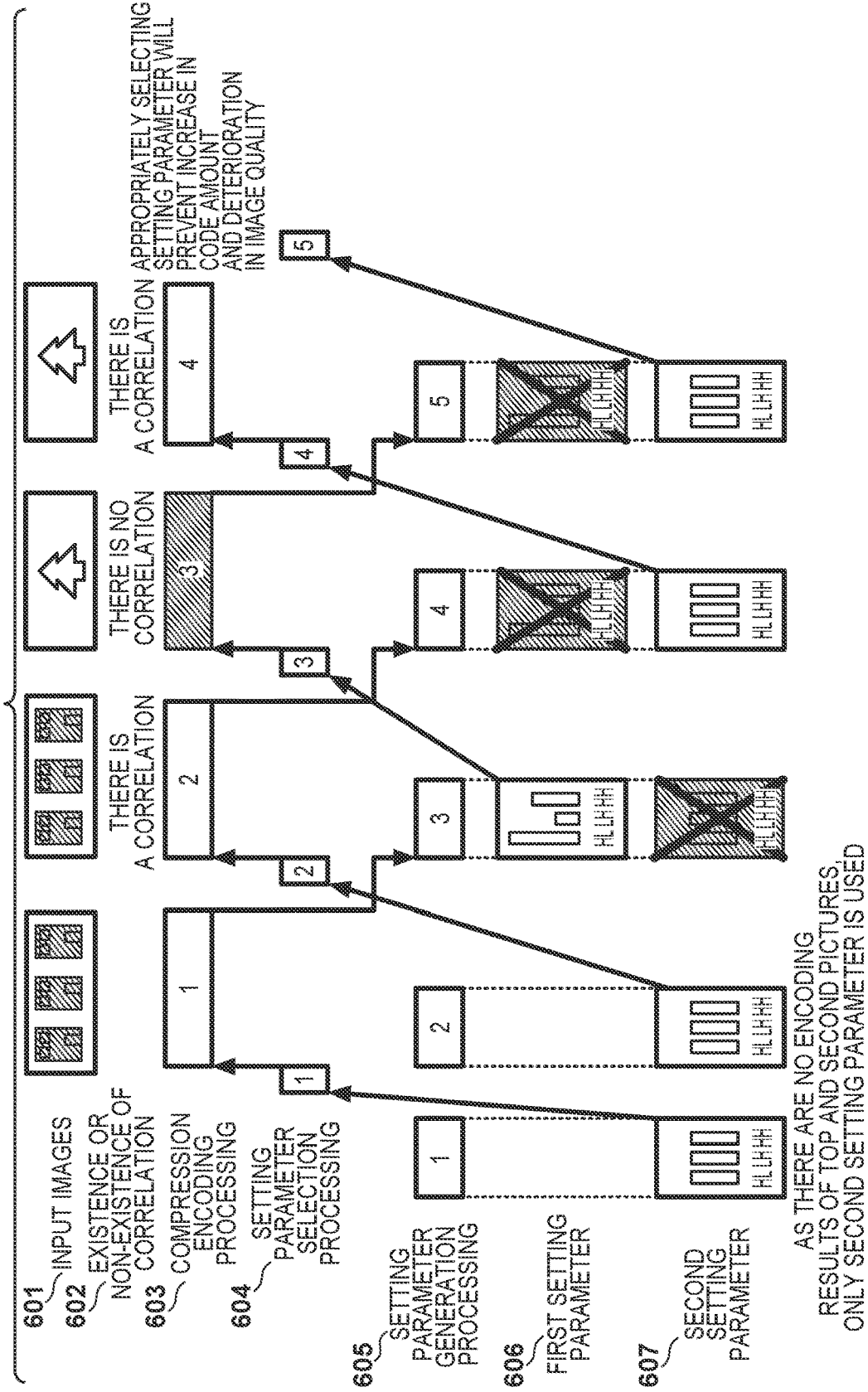

IMAGE CAPTURING APPARATUS, IMAGE PROCESSING METHOD, AND NON-TRANSITORY COMPUTER-READABLE STORAGE MEDIUM

BACKGROUND OF THE INVENTION

Field of the Invention

The invention relates to an image capturing apparatus, an image processing method, and a non-transitory computer-readable storage medium.

Description of the Related Art

Image capturing units can execute so-called development processing that, for example, converts a raw image (RAW image) shot by an image sensor into signals composed of luminance and chrominance by applying de-Bayer processing (demosaicing processing) to the raw image, removes noise from the signals, corrects optical distortion, and optimizes the image. The luminance signals and chrominance signals that have undergone such development processing are generally recorded in a recording medium in a compressed and encoded state.

There are also image capturing apparatuses that can record RAW images. Although an enormous amount of data is needed to record RAW images, advanced users use the RAW images by preference as the RAW images have the advantage of minimizing correction to and deterioration of original images and being editable after shooting.

Such RAW images can be recorded not only as still images, but also as moving images. In recording RAW moving images, it is necessary to perform control for compressing a data amount to a desired code amount so that moving images of a certain period can be recorded in a predetermined recording medium. However, when the data amount exceeds the speed of data transfer to the predetermined recording medium due to a failure to appropriately perform code amount control and quantization control, data corruption occurs in the recording medium. In the case of recording of still images, there is no notion of guarantee on real-time reproduction; on the other hand, in the case of recording of moving images, proper reproduction cannot be performed on a reproduction apparatus when a bitrate of the moving images exceeds a bitrate that guarantees real-time reproduction, even if the moving images have been written to the recording medium. To prevent the occurrence of these problems, image capturing apparatuses need to perform the code amount control and the quantization control appropriately.

Japanese Patent Laid-Open No. 2011-29956 discloses a configuration in which, in order to appropriately perform quantization control, a plurality of quantization parameters are set, image features are extracted through first encoding, and then second encoding is performed by selecting the optimal quantization parameter in accordance with the result of the first encoding.

For the purpose of eliminating the congestion of a bus band of a buffer caused by an enormous data size associated with the increased number of image pixels, there is a configuration that reduces the bus utilization by compressing and encoding RAW images captured by an image sensor immediately after they are generated without writing them to the buffer. With this configuration, a period from the completion of encoding to the start of encoding of the next picture is extremely short, specifically, approximately a blanking period of image capture processing of the image sensor. Therefore, it is difficult to secure time for performing code amount control for the next RAW image between the completion of encoding and the start of next encoding.

In this case, in the code amount control, as setting parameters for the next RAW image need to be calculated during encoding processing, an encoding result of a RAW image that immediately precedes a RAW image to be encoded cannot be fed back to the code amount control. Furthermore, as the feedback of the encoding result is delayed by one image, the provided setting parameters no longer correspond to the substance of the RAW image to be encoded when, for example, the scene has changed, and the controllability of the code amount control may deteriorate.

The technique described in the aforementioned Japanese Patent Laid-Open No. 2011-29956 can perform quantization control even when the scene has changed between pictures, but is unfit for an image capturing apparatus that is required to carry out real-time performances because this technique performs encoding twice.

SUMMARY OF THE INVENTION

The invention provides a technique to improve the controllability of code amount control by performing the code amount control even when images are immediately compressed and encoded.

One aspect of embodiments of the invention relates to an image capturing apparatus, comprising an image capturing unit configured to generate an image by shooting a subject, an encoding unit configured to generate encoded data by encoding the image shot by the image capturing unit, and an encoding control unit configured to calculate a parameter for image encoding performed by the encoding unit, and provide the parameter to the encoding unit, wherein while the encoding unit is generating encoded data of a first image to be encoded, the encoding control unit calculates a first parameter for encoding a second image to be encoded next based on an encoding result of a third image that has been encoded immediately before the first image, and in a period from completion of encoding of the first image by the encoding unit to a start of encoding of the second image by the encoding unit, the encoding control unit provides one of the first parameter and a second parameter to the encoding unit as a parameter for encoding the second image based on a correlation between the first image and the third image, wherein the first parameter being calculated based on the encoding result of the third image, and the second parameter being independent of the encoding result of the third image.

Further features of the invention will become apparent from the following description of exemplary embodiments (with reference to the attached drawings).

BRIEF DESCRIPTION OF THE DRAWINGS

FIG. 6 shows a flow of processing executed by the RAW compression unit 113 and the encoding control unit 171 when the first setting parameter is always selected.

FIG. 8 shows one example of a flow of processing executed by the RAW compression unit 113 and the encoding control unit 171 according to embodiments of the invention.

DESCRIPTION OF THE EMBODIMENTS

First Embodiment

Figure 1:
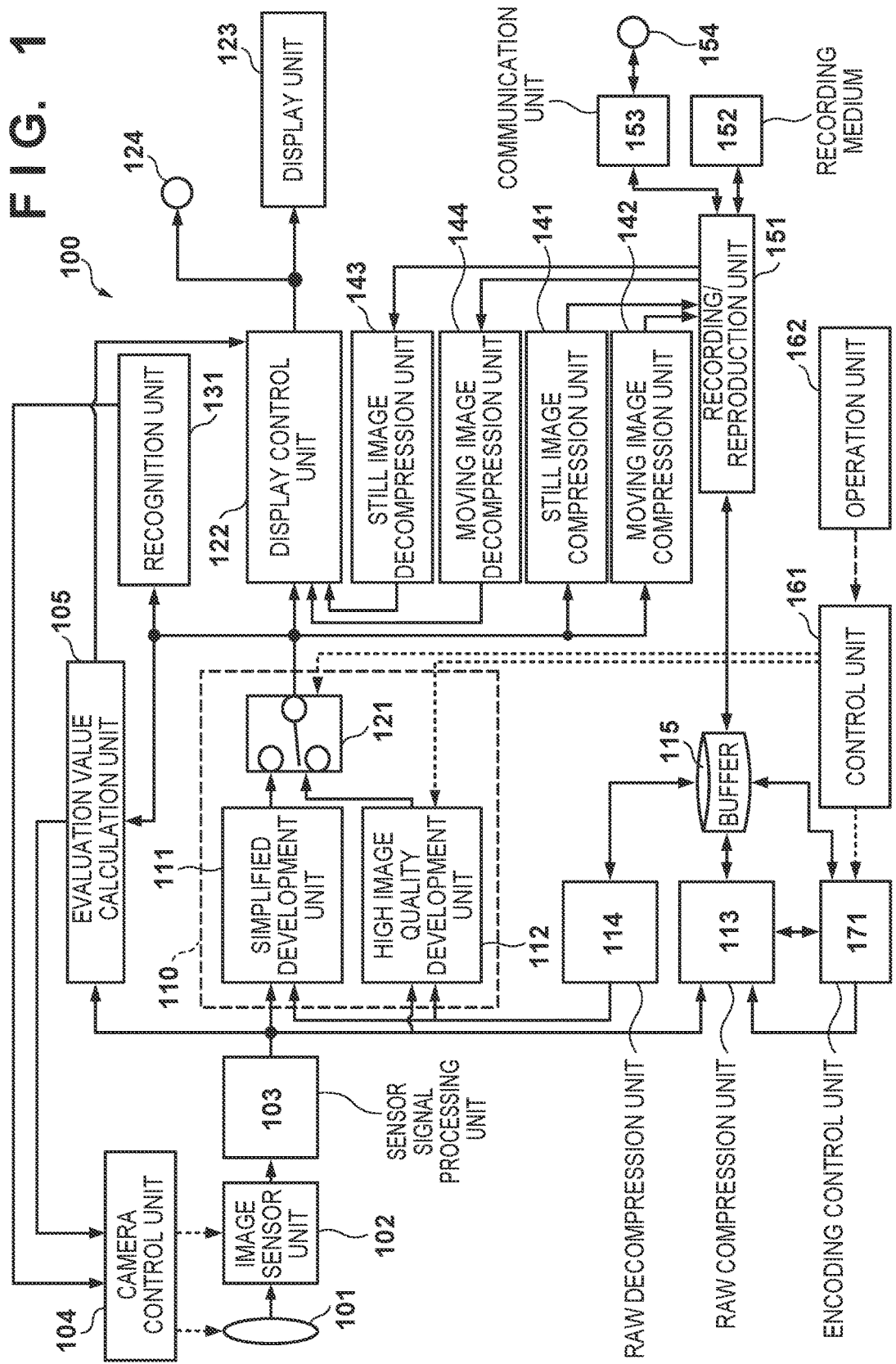
FIG. 1 is a block diagram showing an exemplary configuration of an image capturing apparatus according to embodiments of the invention.

The following describes an embodiment of the invention with reference to the drawings. FIG. 1 is a block diagram showing an exemplary configuration of an image capturing apparatus according to embodiments of the invention. An image capturing apparatus 100 shown in FIG. 1 can have a function of not only recording an image obtained by shooting a subject in a recording medium, but also reproducing the image from the recording medium, applying development processing to the image, displaying the developed image, and transmitting and receiving the image to and from an external apparatus or server (cloud). Therefore, an image processing apparatus, a recording apparatus, a reproduction apparatus, a recording/reproduction apparatus, a communication apparatus, and the like can be used as the image capturing apparatus according to the embodiments of the invention.

The image capturing apparatus 100 can be a digital camera, or any information processing terminal or image capturing apparatus, examples of which include a personal computer, a mobile telephone, a smartphone, a PDA, a tablet terminal, and a digital video camera. In the image capturing apparatus 100 shown in FIG. 1, each block may be configured as an image processing apparatus in the form of hardware using a dedicated logic circuit and memory, except for physical devices including an image sensor, a display element, a recording medium, an input device, and terminals. Alternatively, these image processing apparatuses may be configured in the form of software, in which case they are realized by a computer (e.g., a CPU) executing processing programs stored in a memory. In the foregoing cases, the image capturing apparatus can function as an apparatus intended to display image signals obtained by the image sensor on the display element and record the image signals in the recording medium after applying predetermined image processing to the image signals. The image capturing apparatus can also read out an image recorded in the recording medium and display the image on the display element. FIG. 1 shows a configuration including an image sensor unit 102 in consideration of a case in which the image capturing apparatus functions as a digital camera and the like. However, the embodiments of the invention may be realized with a configuration that does not include the image sensor unit 102 as an image processing apparatus that processes a RAW image.

<Configuration of Image Capturing Apparatus 100>

In FIG. 1, a control unit 161 includes a CPU and a memory that stores control programs executed by the CPU, and controls processing of the entire image capturing apparatus 100. An operation unit 162 includes keys, buttons, a touchscreen, and other input devices that are used by a user to issue an instruction to the image capturing apparatus 100. The operation unit 162 can include, for example, a shutter button. The control unit 161 detects an operation signal from the operation unit 162, and controls the operations of the blocks of the image capturing apparatus 100 so that an operation corresponding to the detected operation signal is performed. A display unit 123 is composed of, for example, a liquid crystal display (LCD), and displays an image that has been shot or reproduced by the image capturing apparatus 100, a menu screen, various types of information, and so forth.

When the operation unit 162 has issued an instruction for starting a shooting operation, an optical image of a subject to be shot is input via an image capture optical unit 101 and formed on the image sensor unit 102. During shooting, a camera control unit 104 controls the operations of the image capture optical unit 101 and the image sensor unit 102 based on the result of calculating evaluation values related to a diaphragm, focus, camera shake, and the like obtained by an evaluation value calculation unit 105, and on subject information extracted by a recognition unit 131.

Figure 2:
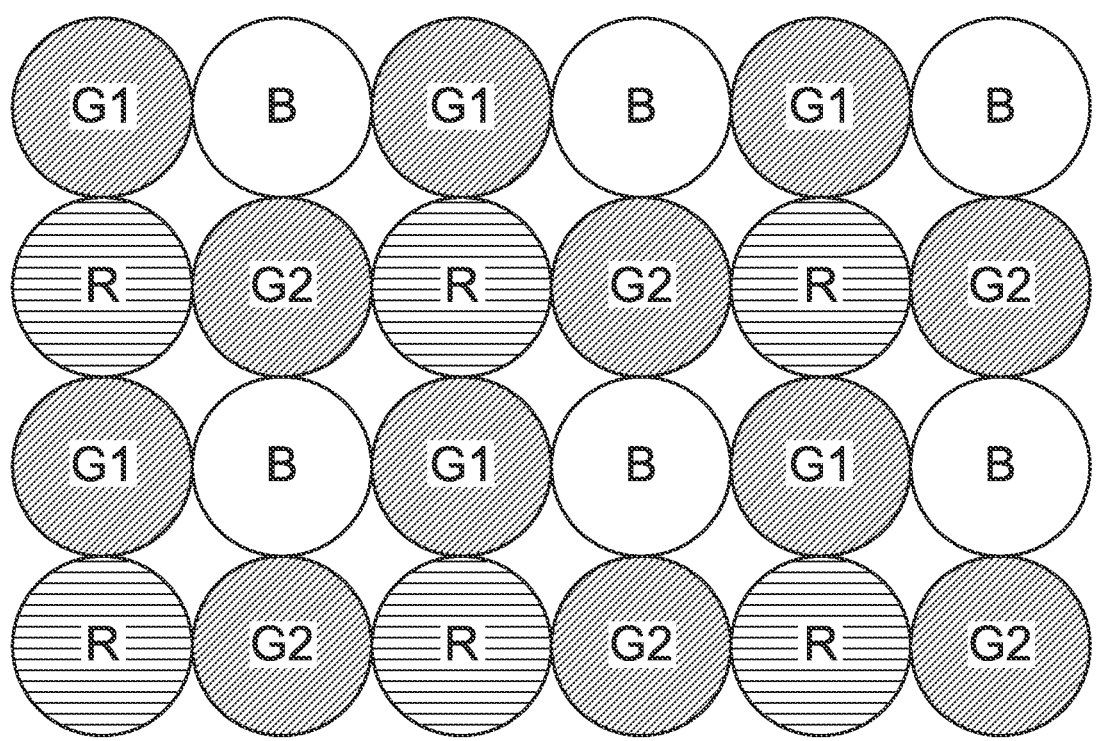
FIG. 2 shows a pixel array according to embodiments of the invention.

The image sensor unit 102 converts light that has passed through red, green, and blue (RGB) color filters disposed on respective pixels into electrical signals, and outputs the electrical signals. FIG. 2 exemplarily shows the color filters disposed in the image sensor unit 102, together with a pixel array of an image processed by the image capturing apparatus 100. As shown in FIG. 2, red (R), green (G), and blue (B) are arranged in a mosaic in such a manner that the color filters are disposed on respective pixels; specifically, a set of one red pixel, one blue pixel, and two green pixels is provided in each group of two-by-two, or four, pixels, and such sets are arranged regularly. This pixel arrangement is generally called a Bayer array.

A sensor signal processing unit 103 applies pixel restoration processing to the electrical signals output from the image sensor unit 102. The restoration processing includes processing for applying pixel interpolation using peripheral pixel values to pixels to be restored, that is to say, values of missing pixels and pixels with low reliability in the image sensor unit 102, and processing for subtracting a predetermined offset value from such values. In the embodiment, an image output from the sensor signal processing unit 103 is expressed as a RAW image, which means an image in a raw (undeveloped) state. After the sensor signal processing unit 103 has output the RAW image, a non-illustrated encoding unit may compress and encode an amount of information of pixels of the RAW image, and then the RAW image may be supplied to a development unit 110 in a subsequent stage (hereinafter, the term "encoding" may imply both compression and encoding). In this case, the result of decoding the compressed and encoded RAW image in the development unit 110 in the subsequent stage is also referred to as the RAW image.

The development unit 110 applies development processing to the RAW image output from the sensor signal processing unit 103. The development unit 110 can include a plurality of different development processing units. The embodiment introduces a case in which the development unit 110 includes a simplified development unit 111 as a first development unit, a high image quality development unit 112 as a second development unit, and a switch unit 121 that selects outputs from the development units. Both the simplified development unit 111 and the high image quality development unit 112 execute so-called development processing that converts the RAW image into signals comprising luminance and chrominance by applying de-Bayer processing (demosaicing processing) to the RAW image, and optimizes the image by removing noise included in the signals and correcting optical skew.

In the embodiment, the high image quality development unit 112 executes each process with higher precision than the simplified development unit 111. Although it can execute high-precision processes and hence obtain a developed image of higher image quality than the simplified development unit 111, the processing load imposed thereon is large. In view of this, the high image quality development unit 112 according to the embodiment is not specialized in performing real-time development in parallel with shooting, but can execute distributed processing over time after shooting. By thus performing the high image quality development over time after shooting rather than during shooting, an increase (peak) in circuit sizes and power consumption can be reduced. On the other hand, although the simplified development unit 111 produces a developed image of lower image quality than the high image quality development unit 112, it is configured to execute development processing that is lighter than the high image quality development so that it can execute the development processing at high speed during shooting. As the processing load imposed on the simplified development unit 111 is small, the simplified development unit 111 is used when performing real-time development in parallel with a shooting operation. The switch unit 121 performs a switching operation under control of the control unit 161 in accordance with the substance of an operation designated by the user via the operation unit 162 and control based on an operation mode that is currently effective.

Although the simplified development unit 111 and the high image quality development unit 112 are discretely provided in the development unit 110 according to the embodiment, the invention covers a configuration in which one development unit switches between operation modes and executes each of simplified development processing and high image quality development processing exclusively. The image obtained through the development processing by the development unit 110 undergoes predetermined display processing by a display control unit 122, and is then displayed on the display unit 123. The image obtained through the development processing may be output from an image output terminal 124 to an externally connected display device. The image output terminal 124 includes a general-purpose interface, examples of which include HDMI and SDI.

The image obtained through the development processing by the development unit 110 is also supplied to the evaluation value calculation unit 105. The evaluation value calculation unit 105 calculates evaluation values related to a focus state, an exposure state, and so forth from the image.

The image obtained through the development processing by the development unit 110 is also supplied to the recognition unit 131. The recognition unit 131 has a function of detecting and recognizing subject information in the image. For example, it detects a face within a screen presented by the image, and upon detection, performs operations including outputting of information indicating the position of the face, and authentication of a specific person based on characteristic information of the face and the like.

The image obtained through the development processing by the development unit 110 is also supplied to a still image compression unit 141 and a moving image compression unit 142. The still image compression unit 141 is used to compress the image as a still image. The moving image compression unit 142 is used to compress the image as a moving image. Each of the still image compression unit 141 and the moving image compression unit 142 performs high-efficiency encoding (compression encoding) of the target image to generate an image with a compressed amount of information, and converts the generated image into image data (still image data or moving image data). Still image compression can be performed in accordance with JPEG or other methods, whereas moving image compression can be performed in accordance with MPEG-2, H.264, H.265, or other methods.

A RAW compression unit 113 functions as an encoding unit that performs high-efficiency encoding of the RAW image output from the sensor signal processing unit 103 based on an instruction from an encoding control unit 171 using a technique of, for example, wavelet transform or delta encoding. In the embodiment, the RAW image is supplied from the sensor signal processing unit 103 directly to the RAW compression unit 113 without going through a temporary storage medium, such as a buffer 115. This is because, in a configuration that supplies data with an enormous data size, such as the RAW image, to the RAW compression unit 113 after temporarily storing the data to the buffer, a bus band becomes congested, which is unfit for use in a situation where immediate processing is required, e.g., during shooting of moving images. The RAW compression unit 113 converts the input RAW image to be encoded into RAW image data in a compressed state, and stores the compressed RAW image data to the buffer (temporary storage memory) 115. The buffer 115 temporarily stores encoded data serving as RAW image data for processing in a subsequent stage. For example, it can temporarily store RAW image data generated by the RAW compression unit 113 in writing the same to a recording medium 152, and temporarily store RAW image data that has been read out from the recording medium 152 in providing the same to a RAW decompression unit 114. RAW image data can be left in the buffer 115 so that it can be read out again, or may be moved to and recorded in another recording medium (deleted from the buffer 115) after it has been stored to the buffer 115.

The RAW decompression unit 114 reads out RAW image data stored in the buffer 115, and executes decompression processing for generating a RAW image by decoding compressed RAW image data. The RAW image obtained through the decompression processing by the RAW decompression unit 114 is supplied to the simplified development unit 111 and the high image quality development unit 112 in the development unit 110.

The control unit 161 notifies the encoding control unit 171 of an operation mode that is currently selected, that is to say, one of the following two operation modes: "moving images" for recording moving images, and "still image" for shooting a still image. While the RAW compression unit 113 is executing encoding processing, the encoding control unit 171 executes code amount control processing for calculating a setting parameter for the next picture. Based on the operation mode from the control unit 161 and on amounts of generated code of a previous picture from the RAW compression unit 113, the encoding control unit 171 performs code amount control, and configures settings related to target code amounts of a picture and quantization control with respect to the RAW compression unit 113.

A recording/reproduction unit 151 records a RAW file containing RAW image data, a still image file containing still image data, and a moving image file containing moving image data in the recording medium 152. Examples of the recording medium 152 include a built-in large-capacity memory or hard disk, a removable memory card, and the like. The recording/reproduction unit 151 can also read out the still image file, the moving image file, and the RAW file from the recording medium 152.

The recording/reproduction unit 151 can also write and read out various types of files to and from an external storage or server via a communication unit 153. Using a communication terminal 154, the communication unit 153 can access the Internet and an external device via wireless or wired communication.

When a reproduction operation has been started, the recording/reproduction unit 151 obtains a desired file from the recording medium 152 or via the communication unit 153, and reproduces the desired file. When the file to be reproduced is the RAW file, the recording/reproduction unit 151 stores RAW image data contained in the obtained RAW file to the buffer 115. When the file to be reproduced is the still image file, the recording/reproduction unit 151 supplies still image data contained in the obtained still image file to a still image decompression unit 143. When the file to be reproduced is the moving image file, the recording/reproduction unit 151 supplies moving image data contained in the obtained moving image file to a moving image decompression unit 144. The still image decompression unit 143 executes decompression processing for generating still images by decoding the still image data contained in the input still image file, and supplies the still images as reproduction still images to the display processing unit 122. The moving image decompression unit 144 executes decompression processing for generating moving images by decoding the moving image data contained in the input moving image file, and supplies the moving images as reproduction moving images to the display processing unit 122.

<Configuration of RAW Compression Unit 113>

Figure 3A:
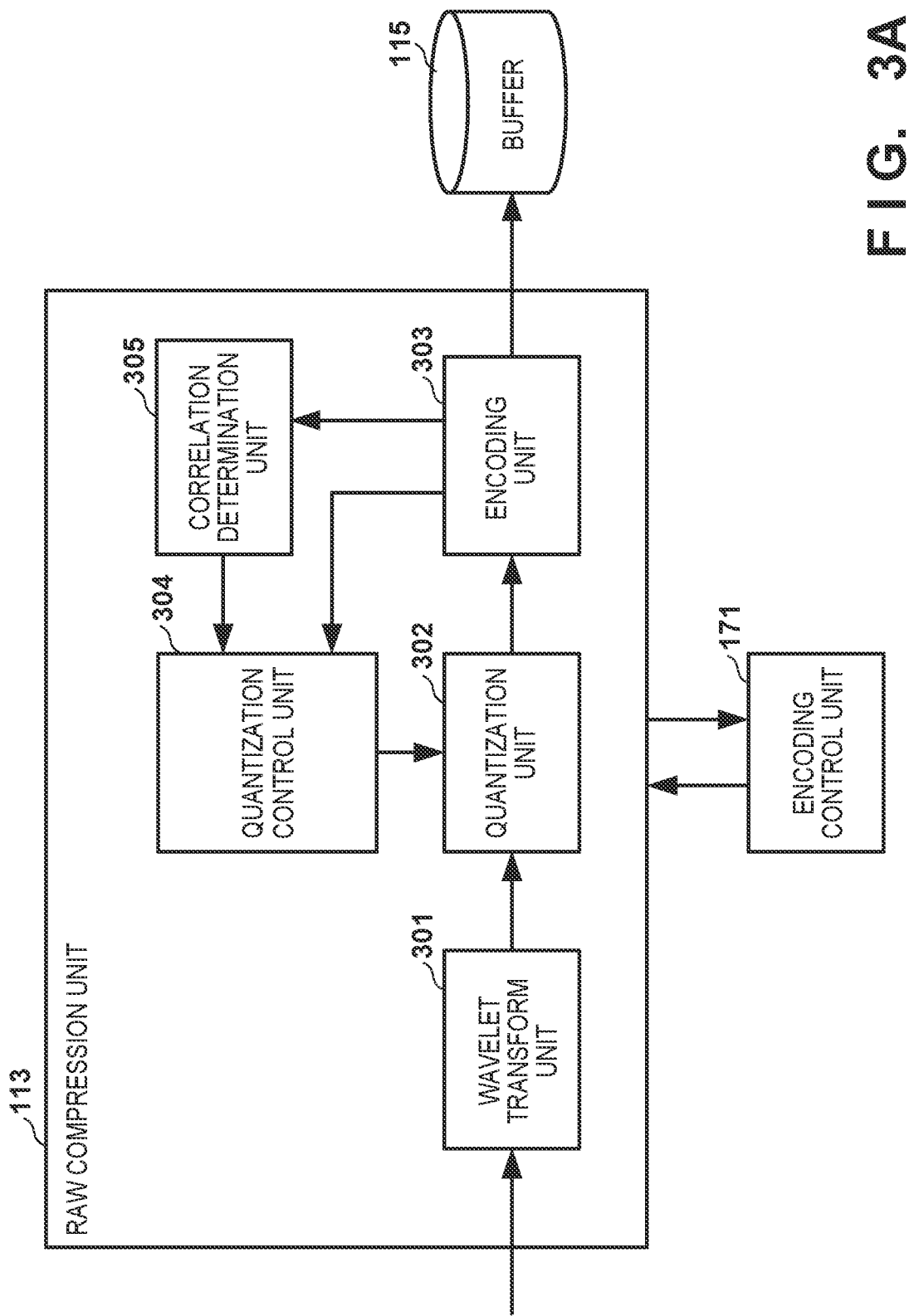
FIG. 3A shows a RAW compression unit 113 according to embodiments of the invention.

The operations of the RAW compression unit 113 will now be described with reference to FIG. 3A. FIG. 3A is a block diagram showing an exemplary configuration of the RAW compression unit 113. The RAW compression unit 113 includes a wavelet transform unit 301, a quantization unit 302, an encoding unit 303, a quantization control unit 304, and a correlation determination unit 305. The wavelet transform unit 301 applies wavelet transform processing to a RAW image output from the sensor signal processing unit 103, converts the RAW image into a subband image, and outputs a coefficient. The quantization unit 302 quantizes the coefficient obtained through the wavelet transform on a subband-by-subband basis, and outputs the quantized coefficient to the encoding unit 303. The encoding unit 303 compresses the quantized coefficient using, for example, Golomb coding or another encoding method, and outputs encoded data serving as RAW image data to the buffer 115. Based on an instruction from the encoding control unit 171, the quantization control unit 304 obtains information of amounts of generated code from the encoding unit 303, calculates a quantization parameter in predetermined units, and notifies the quantization unit 302 of the quantization parameter. Calculation of the quantization parameter in the quantization control unit 304 will be described later with reference to FIGS. 4A and 4B.

The correlation determination unit 305 receives the amounts of generated code from the encoding unit 303, and determines whether there is a correlation between pictures based on the amounts of generated code of a previous picture and on the amounts of generated code of a picture to be encoded. Whether there is a correlation is determined based on whether a difference between amounts of generated code and a target code amount exceeds a threshold. This threshold can be obtained from the encoding control unit 171. The correlation determination unit 305 notifies the quantization control unit 304 and the encoding control unit 171 of correlation information (existence or non-existence of a correlation) obtained as a result of the determination.

At this time, it can notify the quantization control unit 304 of pieces of correlation information for the respective regions that constitute a picture, and notify the encoding control unit 171 of per-picture correlation information. Regions that constitute a picture will be described later with reference to FIG. 4A. In the case of the top picture, as a correlation between pictures cannot be obtained, the encoding control unit 171 is notified of correlation information indicating "there is a correlation." Furthermore, as will be described later, the amounts of generated code in an encoding result differ between a first setting parameter and a second setting parameter. Therefore, when a picture that immediately succeeds a picture encoded using the second setting parameter is encoded using the later-described first setting parameter, there is a possibility that the pictures will be determined to have no correlation with each other due to the difference in the amounts of generated code attributed to the types of the used parameters, even if the pictures have the same pattern. In view of this, even when the second setting parameter is used, the target picture is treated as the equivalent of the top picture, and the encoding control unit 171 is notified of "there is a correlation." When notified of "there is no correlation" by the correlation determination unit 305, the quantization control unit 304 determines that the instruction from the encoding control unit 171 is unfit for the picture to be encoded, cancels the instruction from the encoding control unit 171, and performs quantization control with respect to the subsequent regions so that, for example, code amounts allocated to the subbands HH, LH, and HL of the same decomposition Lv are even. The details will be described later.

Figure 3B:
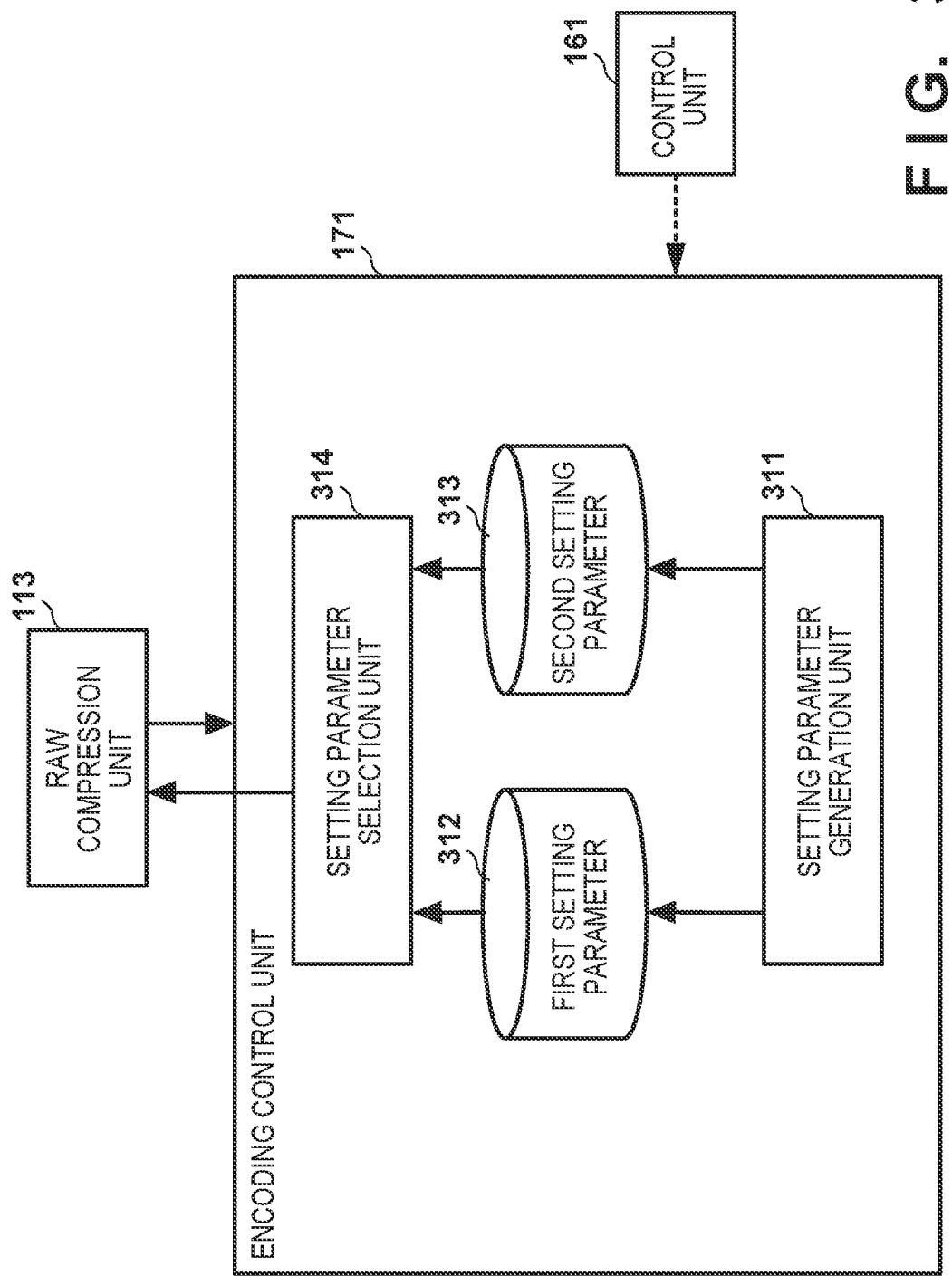
FIG. 3B is a block diagram showing an exemplary configuration of an encoding control unit 171 according to embodiments of the invention.

The operations of the encoding control unit 171 will now be described using FIG. 3B. The encoding control unit 171 includes a setting parameter generation unit 311, a first setting parameter storage unit 312, a second setting parameter storage unit 313, and a setting parameter selection unit 314. The setting parameter generation unit 311 performs code amount control based on an operation mode from the control unit 161 and the amounts of generated code from the RAW compression unit 113, generates a first setting parameter composed of a per-picture target code amount, a per-picture quantization parameter, and thresholds used by the correlation determination unit 305 to determine a correlation, and stores the first setting parameter to the first setting parameter storage unit 312. Here, the target code amount includes target code amounts for the respective subbands, which will be described later with reference to FIG. 5B. Furthermore, the amounts of generated code from the RAW compression unit 113 is not used; instead, a second setting parameter composed of a per-picture target code amount and a per-picture quantization parameter is generated based on an operation mode from the control unit 161, and stored to the second setting parameter storage unit 313. Based on correlation information from the RAW compression unit 113, the setting parameter selection unit 314 selects one of the first setting parameter stored in the first setting parameter storage unit 312 and the second setting parameter stored in the second setting parameter storage unit 313, and sets a target code amount and quantization control with respect to the RAW compression unit 113. More specific operations will be described later.

<Encoding Control Unit 171: Using Two Operation Modes for Different Purposes>

When the current operation mode is "moving images," the encoding control unit 171 sets a per-picture target code amount with respect to the RAW compression unit 113, and enables the quantization control unit 304 to perform quantization parameter control within a screen (within the same RAW image). On the other hand, when the current operation mode is "still image," a per-picture target code amount is not set with respect to the RAW compression unit 113, and the quantization control unit 304 is disabled. In this operation mode, as the RAW compression unit 113 generates RAW image data at low speed, the buffer 115 does not crash even if the code amount control is not performed. Therefore, by disabling the quantization control unit 304, image quality can be prioritized over the code amount control. The following describes the specifics of code amount control and quantization control for a case in which the current operation mode is "moving images."

<Quantization Control During "Moving Images" Mode>

Figure 4A:
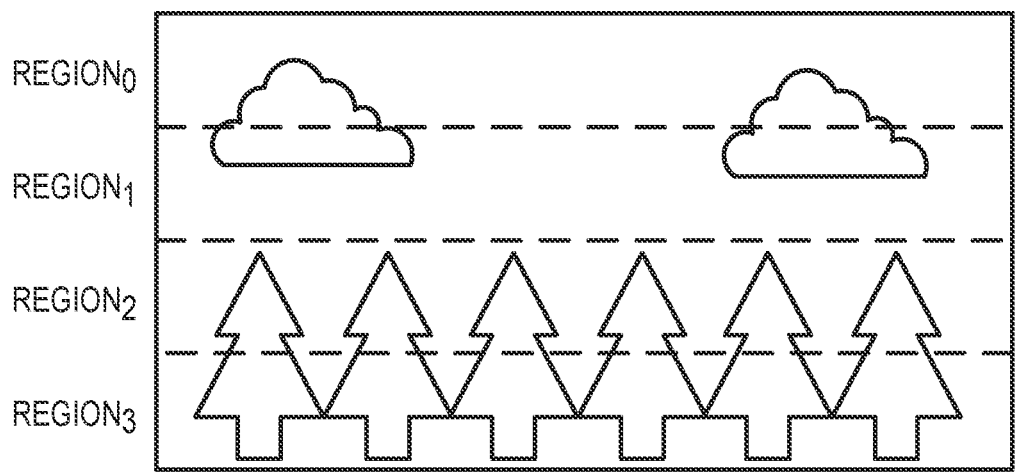
FIG. 4A shows an example of an image to be encoded according to embodiments of the invention.
Figure 4B:
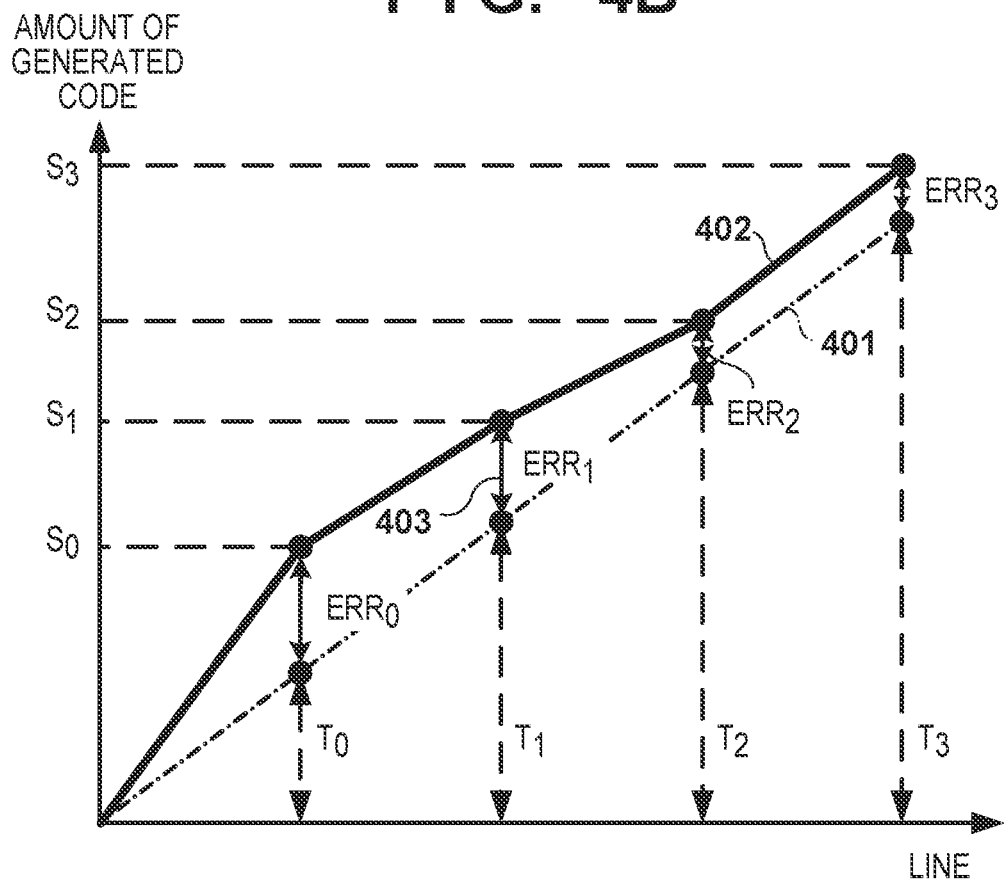
FIG. 4B shows a relationship between target code amounts and amounts of generated code within a screen according to embodiments of the invention.

The following describes the operations of the image capturing apparatus 100 during the "moving images" mode. The quantization control during the "moving images" mode will be described using FIGS. 4A and 4B. FIG. 4A shows an image to be encoded in the embodiment. FIG. 4B shows a relationship between target code amounts and amounts of generated code within a screen.

In FIG. 4A, a RAW image to be encoded is divided into four regions consisting of region$_0$ to region$_3$. In this case, the quantization control unit 304 determines quantization parameters for the respective regions, and notifies the quantization unit 302 of the quantization parameters. Note that the foregoing method of dividing the image into the regions, as well as the number of divided regions, is merely an example, and the image may be divided into more regions.

Next, a method used by the quantization control unit 304 to determine the quantization parameters for the respective regions will be described using FIG. 4B. A dot-and-dash line 401 indicates a total target code amount in each region, and presents a result of calculating values of the total target code amounts $T_0$ to $T_3$ for the four regions from the top region. As shown in FIG. 4B, in the picture, the target code amounts allocated to the regions are even. A solid line 402 indicates a total amount of generated code in each region. For example, the total amount of generated code in the top region is $S_0$. The total amount of generated code $S_1$ in the second region that succeeds the top region is a sum of $S_0$ and the amounts of generated code in the second region ($S_1-S_0$). A similar calculation is performed with respect to the third and subsequent regions. Each arrow 403 indicates an code amount difference ERR between the total target code amount 401 and the total amount of generated code 402. It is apparent from FIG. 4B that the amounts of generated code $S_0$ exceeds the target code amount $T_0$ in the top region. In this case, in the second region, control is performed by determining quantization steps using the following equation, so as to suppress the amounts of generated code in the second region and hence bring $T_1$ and $S_1$ close to each other by increasing the number of quantization steps used as the quantization parameter compared with the top region.

$$Q_n = Q_0 + ERR_{n-1} \times R \quad \text{(Expression 1)}$$

$Q_n$: the quantization parameter (the number of quantization steps) in the region N $ERR_n$: the total code amount difference up to the region N R: control sensitivity According to Expression 1, the quantization parameter set in the region$_0$ is used as a reference, and the code amount difference between the total target code amount 401 and the total amount of generated code 402 is reduced by adjusting this quantization parameter in accordance with the magnitude of ERR. A parameter that was determined by the setting parameter generation unit 311 and notified by the encoding control unit 171 is used as the quantization parameter set in the region$_0$. Expression 1 is similar to a typical expression used in an image encoding method presented by MPEG-2 Test Model 5, and a quantization code is obtained by performing feedback control so as to reduce the difference between the target code amount and the actual amounts of generated code in a picture.

Although FIG. 4B illustrates a case in which the target code amounts that are allocated to the respective regions are even, the target code amounts that are allocated to the respective regions may be weighted. For example, the target code amounts that are allocated to the respective regions can be weighted because the characteristics of the images can be grasped based on an encoding result of a picture that immediately precedes a picture to be encoded. Referring to an example of FIG. 4A, weighting may be performed so that the target code amount can be reduced in each of the region$_0$ and the region$_1$ that are mainly occupied by the sky with less high-frequency components, whereas the target code amount can be increased in each of the region$_2$ and the region$_3$ that are mainly occupied by trees with many high-frequency components.

<First Setting Parameter and Second Setting Parameter>

Figure 5A:
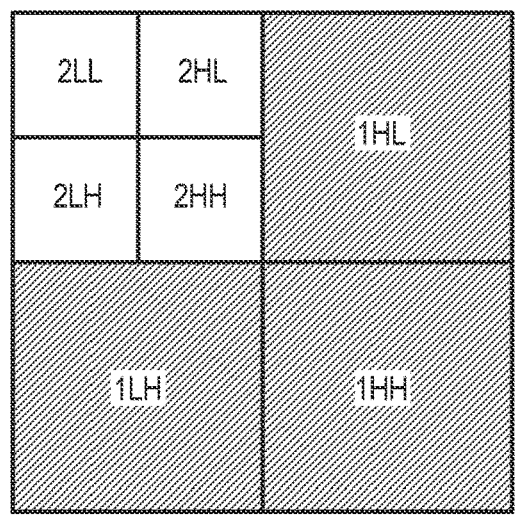
FIG. 5A is a conceptual diagram showing subbands according to embodiments of the invention.
Figure 5B:
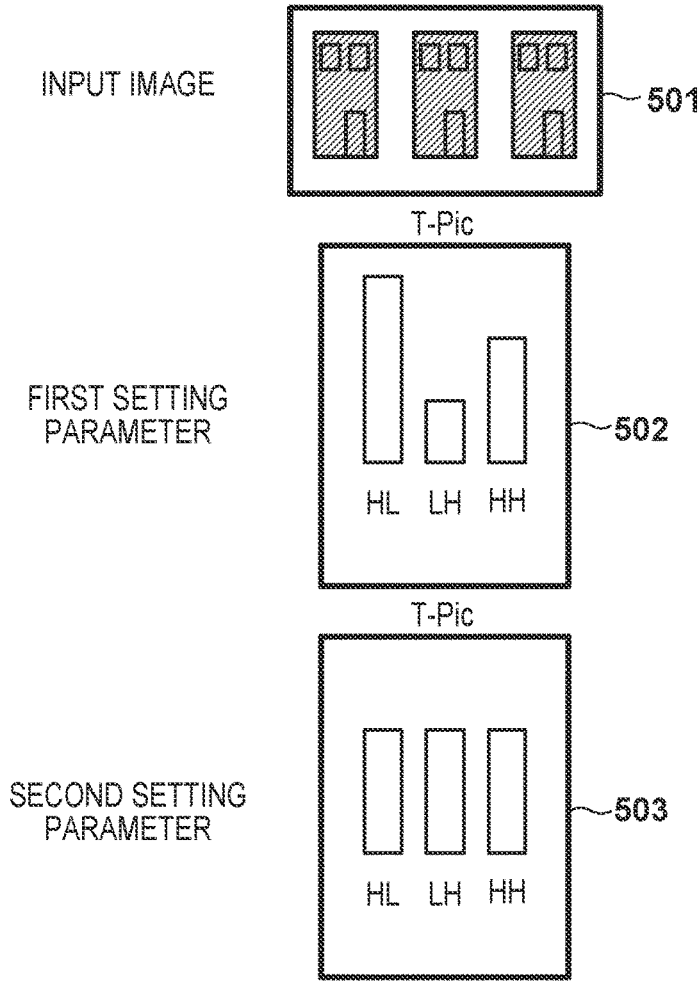
FIG. 5B is a diagram for describing examples of a first setting parameter and a second setting parameter according to embodiments of the invention.

The following describes the concepts of the first and second setting parameters with reference to FIGS. 5A and 5B. First, FIG. 5A is a conceptual diagram showing the subbands that are output through the wavelet transform. Here, the subbands are formed by applying each of vertical filtering and horizontal filtering twice in the wavelet transform, that is to say, the decomposition level is 2. L denotes a low band, H denotes a high band, and a numeric value that precedes L or H denotes a layer level. For example, 1HL denotes a subband image with a layer level of 1, in which the horizontal direction corresponds to high-band components and the vertical direction corresponds to low-band components. A subband that is closer to the upper left corner has more low-band components, and the energy of the image is concentrated therein.

FIG. 5B is a conceptual diagram showing an exemplary relationship among the input image, the first setting parameter, and the second setting parameter. The first setting parameter and the second setting parameter that are exemplarily shown here are setting parameters for three subbands 1HL, 1LH, and 1HH belonging to the same decomposition level LV1 in the wavelet transform among setting parameters of all subbands; they can contain setting parameters for a subband of another level.

Specifically, in the case of an input image 501, a first setting parameter 502 and a second setting parameter 503 are obtained. An image like the input image 501 includes many edges in the vertical direction and many high-frequency components in the horizontal direction; thus, applying the wavelet transform thereto in the horizontal direction is likely to increase a subband coefficient on the high-pass side and cause large amounts of generated code after compression encoding. In view of this, regarding the first setting parameter 502, the allocation of code amounts for the subbands HH, LH, and HL of the same Lv is adjusted based on an encoding result, specifically, the target code amounts are set so as to allocate more code amounts for 1HL components and allocate less code amounts for 1LH components. Note that the first setting parameter 502 is a parameter set corresponding to the pattern of the input image 501, and the first setting parameter 502 is not limited to this pattern. For example, when the input image includes many edges in the horizontal direction and many high-frequency components in the vertical direction, it may be preferable to set the target code amounts with respect to the first setting parameter so as to allocate more code amounts for 1LH components and allocate less code amounts for 1HL components.

On the other hand, regarding the second setting parameter 503, code amounts are allocated uniformly to the subbands HH, LH, and HL of the same Lv irrespective of the input image. Although there may be cases in which the second setting parameter 503 is not optimal for some input images, this parameter can achieve certain code amount controllability and image quality irrespective of the input image. The first setting parameter and the second setting parameter may be the same in terms of the sum of the target code amounts. It may be considered that the first setting parameter, which is the same as the second setting parameter in terms the total target code amount, is obtained by changing the target code amounts of the second setting parameter that are allocated to the respective subbands. Therefore, as long as the RAW compression unit 113 is notified of the first setting parameter, it can generate the second setting parameter from the first setting parameter even if it is not notified of the second setting parameter.

<When Setting Parameter Selection Unit 314 Cannot Execute Processing Appropriately>

With reference to FIG. 6, the following describes a failure to appropriately allocate a setting parameter, which occurs when switching among scenes. FIG. 6 shows a flow of processing executed by the RAW compression unit 113 and an encoding control unit 171 when the setting parameter selection unit 314 always selects the first setting parameter.

Input images 601 show the substances of input images (pictures) to be encoded and their input timings. The numeric values above the input images denote picture numbers. Existence or non-existence of a correlation 602 indicates whether each input image has a correlation with an immediately preceding input image. In the figure, the correlation is lost when a scene change occurs between the second picture and the third picture. Existence or non-existence of a correlation on a picture-by-picture basis is identified after completion of compression encoding processing (hereinafter also simply referred to as "encoding processing") for one picture. Therefore, after completion of compression encoding processing for one picture, the correlation determination unit 305 notifies the setting parameter selection unit 314 of existence or non-existence of a correlation 602. Compression encoding processing 603 shows timings at which the RAW compression unit 113 applies the compression encoding processing to the input images 601. The width of each frame shown in the figure is equivalent to a period in which the compression encoding processing is executed, and the numeric value inside each frame denotes a picture number targeted for the compression encoding processing.

Setting parameter selection processing 604 shows timings for setting parameter selection processing, and the numeric value inside each frame denotes a picture number for which a setting parameter is to be selected. For example, immediately before applying the compression encoding processing 603 to a picture 1, which is the top input image, the setting parameter selection processing is executed with respect to the picture 1, and the setting parameter selection unit 314 notifies the RAW compression unit 113 of the setting parameter. The setting parameter selection processing 604 is executed in a vacant period (blanking period) of image capture processing of the image sensor.

Setting parameter generation processing 605 shows timings for generating a setting parameter, and the numeric value in each frame denotes a picture number of a picture for which the generated setting parameter is to be used. For example, immediately before selecting a setting parameter for the picture 1, which is the top input image, the setting parameter generation processing is executed with respect to the picture 1, and the setting parameter selection processing 604 selects the generated setting parameter. A first setting parameter 606 and a second setting parameter 607 are examples of parameters generated at this time.

The setting parameter generation processing 605 is started in alignment with the timing at which the RAW compression unit 113 starts the compression encoding processing 603. At this time, the setting parameter is generated based on an encoding result of a picture that immediately precedes a picture targeted for the compression encoding processing 603. For example, at the timing at which the compression encoding processing 603 is executed with respect to a picture 2, the setting parameter for a picture 3 is generated based on the result of the compression encoding processing 603 that has been executed with respect to the picture 1. Therefore, when generating the setting parameters for the picture 1 and the picture 2, the encoding result cannot be obtained from the RAW compression unit 113 because there is no picture for which the compression encoding processing has been completed at that point. For this reason, with respect to the picture 1 and the picture 2, the setting parameter generation unit 311 generates only the second setting parameter and notifies the RAW compression unit 113 of the second setting parameter. As shown in FIG. 5B, in the second setting parameter 503, code amounts are allocated uniformly to the subbands HH, LH, and HL of the same Lv, for example.

With respect to the picture 3 and the subsequent pictures, the setting parameter generation unit 311 generates both of the first setting parameter 606 and the second setting parameter 607, and the setting parameter selection unit 314 notifies the RAW compression unit 113 of the first setting parameter. However, in an example shown in FIG. 6, the picture 2 and the picture 3 are different input images because a scene change occurs therebetween; thus, if the quantization control is performed as is, the code amount controllability worsens, and the image quality deteriorates. With regard to the picture 4, the RAW compression unit 113 is notified of the first setting parameter that has been calculated based on an encoding result of the picture 2. In the RAW compression unit 113, since there is a small change between the input images representing the third picture and the forth picture, the correlation determination unit 305 determines that "there is a correlation," and the quantization control unit 304 performs the quantization control based on the first setting parameter it has been notified of. At this time, the input image representing the second picture is different from the input images representing the third and subsequent pictures because a subject has changed; thus, the allocation of target code amounts to the subbands in the first setting parameter notified for the fourth picture does not correspond to the actual input image. Therefore, if the quantization control is performed as is, the code amount controllability worsens, and the image quality deteriorates. With respect to the following fifth picture, the setting parameter selection unit 314 notifies the RAW compression unit 113 of the first setting parameter.

As described above, when the setting parameter selection unit 314 always selects the first setting parameter, the selected first setting parameter is not always appropriate. In the example of FIG. 6, the second setting parameter should be selected for the picture 3 because the scene change occurs between this picture and the immediately preceding picture 2. However, as this scene change is unknown at the start of the compression encoding processing for the picture 3, the first setting parameter is selected. Furthermore, although the second setting parameter should be selected for the picture 4 that immediately succeeds the scene change, the first setting parameter is selected therefor based on the picture prior to the scene change. Moreover, with respect to the picture 5, the first setting parameter that has been generated based on the compression encoding result of the picture 3, for which an appropriate setting parameter has not been selected, has been selected although it should not be selected in consideration of unstable processing executed by the RAW compression unit 113 for the picture 3.

As described above, a parameter that has been set based on a picture for which the compression encoding processing has been completed can be a factor that worsens the code amount controllability for pictures after the scene change and deteriorates the image quality. In view of this, the embodiment described below provides a selection method that improves a setting parameter after the scene change.

<Setting Parameter Selection Processing>

Figure 7:
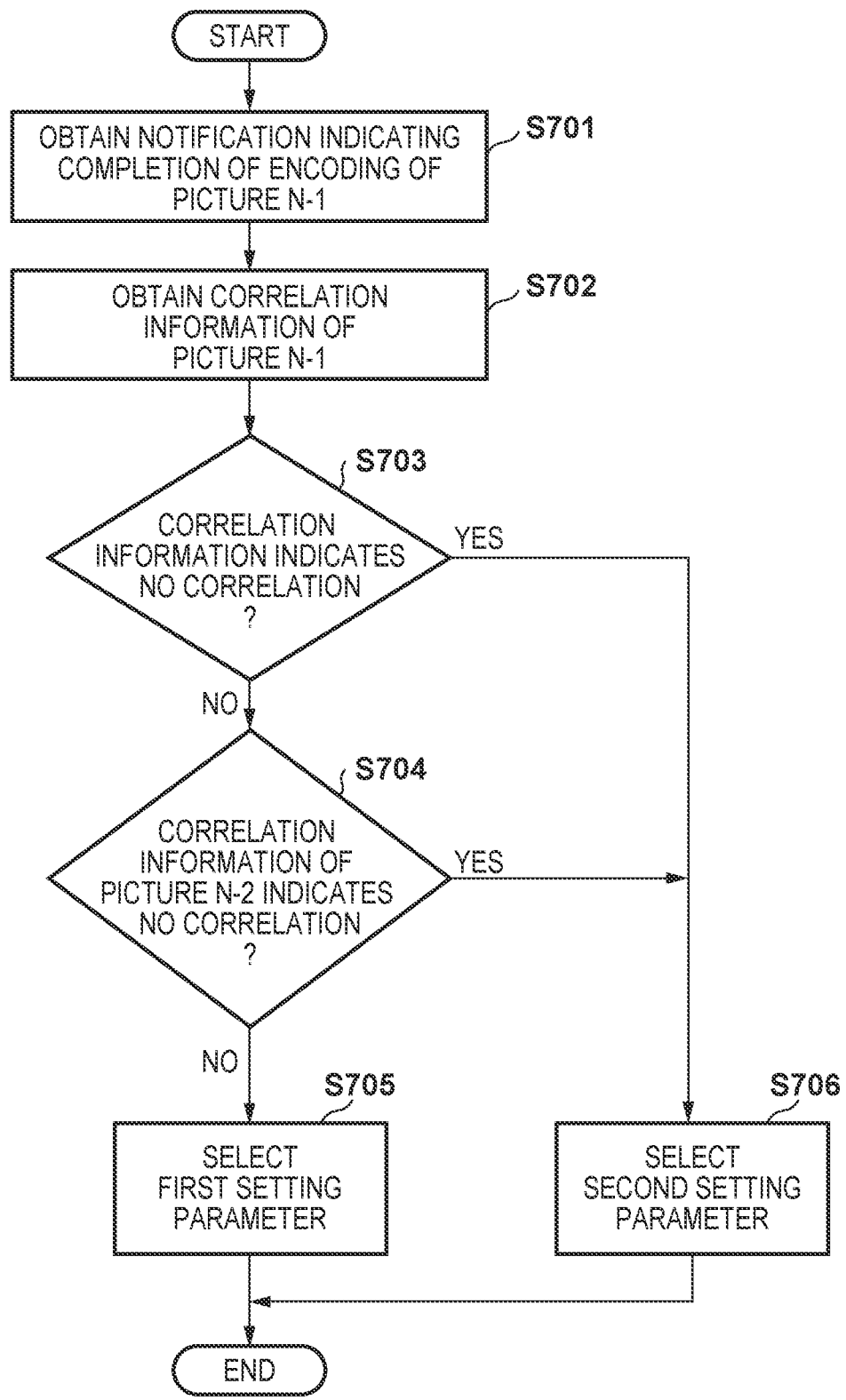
FIG. 7 is a flowchart showing one example of setting parameter selection processing according to embodiments of the invention.

FIG. 7 is a flowchart showing one example of processing of the setting parameter selection unit 314 according to the embodiment for solving the aforementioned problem. Using FIG. 7, the following describes a method used by the setting parameter selection unit 314 to select a setting parameter of which the RAW compression unit 113 is to be notified from among the first setting parameter and the second setting parameter when the RAW compression unit 113 starts encoding processing with respect to a picture N to be encoded. Here, N denotes a picture number.

In step S701, the setting parameter selection unit 314 receives, from the RAW compression unit 113, a notification indicating completion of encoding of a picture N−1 that immediately precedes the picture N to be encoded. Next, in step S702, correlation information related to the picture N−1 is obtained from the RAW compression unit 113. This correlation information indicates existence or non-existence of a correlation between the picture N−1 for which encoding has been completed and a picture N−2 that immediately precedes it. For example, referring to the example of FIG. 6, when the picture N to be encoded is the picture 5 and the picture N−1 for which encoding has been completed is the picture 4, correlation information indicating a correlation between the picture 4 and the picture 3 is obtained. As the obtained correlation information is necessary for executing later step S704 with respect to the next picture N+1, the obtained correlation information is stored at least until a setting parameter is selected for the next picture N+1.

In the next step S703, whether the obtained correlation information related to the picture N−1 indicates "there is no correlation" is determined. If the correlation information indicates "there is no correlation," the processing proceeds to step S706. On the other hand, if the correlation information does not indicate "there is no correlation" and indicates "there is a correlation," the processing proceeds to step S704. In step S704, correlation information related to the picture N−2 that immediately precedes the picture N−1 is referenced, and whether the correlation information related to the picture N−2 indicates "there is no correlation" is determined. For example, referring to the example of FIG. 6, when the picture N to be encoded is the picture 5 and the picture N−1 for which encoding has been completed is the picture 4, correlation information indicating a correlation between the picture 3 and the picture 2 is obtained as correlation information related to the picture 3. If the correlation information related to the picture N−2 also indicates "there is no correlation," the processing proceeds to step S706. On the other hand, if the correlation information related to the picture N−2 does not indicate "there is no correlation" and indicates "there is a correlation," the processing proceeds to step S705. In step S705, the first setting parameter is selected, and the RAW compression unit 113 is notified of the same. In step S706, the second setting parameter is selected, and the RAW compression unit 113 is notified of the same.

A description is now given of the reason why the correlation information related to the picture N−2 is determined in step S704. First of all, the embodiment is based on the premise that the first setting parameter used by the RAW compression unit 113 is generated based on an encoding result of the picture N−2, which is two pictures ahead of the picture N to be encoded. Even if the scene change has not occurred in the immediately preceding picture N−1 and the result of the determination indicates "there is a correlation," there is a possibility that the scene change has occurred in the picture N−2. If the scene change has occurred in the picture N−2, the encoding processing for the picture N−2 becomes unstable, and the reliability of the first setting parameter generated based on the encoding result of the picture N−2 becomes low. In this case, as selecting the first setting parameter has a possibility of worsening the encoding efficiency, the second setting parameter that can achieve certain code amount controllability and image quality should be selected. Therefore, even if the correlation information related to the immediately preceding picture indicates "there is a correlation," whether both of the correlation information related to the immediately preceding picture and the correlation information related to the picture that further precedes it indicate "there is a correlation" in a row is checked at least, and if it is determined that both of them indicate "there is a correlation" in a row, the first setting parameter is selected.

<When Setting Parameter Selection Unit 314 Executes Processing Appropriately>

With reference to FIG. 8, the following describes a case in which a setting parameter can be appropriately assigned by executing processing corresponding to the flowchart of FIG. 7, even when the scene switch has occurred. FIG. 8 shows a flow of processing executed by the RAW compression unit 113 and the encoding control unit 171 when the setting parameter selection unit 314 appropriately selects a setting parameter based on correlation information. In FIG. 8, the elements from the input images to the second setting parameter are similar to those shown in FIG. 6, and thus are given the same reference signs thereas. In FIG. 8 also, the correlation between the input images 601 is lost when a scene change occurs between the second picture and the third picture. The following mainly describes the differences from FIG. 6 in detail.

The picture 1 and the picture 2 are similar to those illustrated in FIG. 6. In executing the compression encoding processing with respect to the next picture 3, the setting parameter selection unit 314 notifies the RAW compression unit 113 of the first setting parameter calculated based on an encoding result of the top picture, because the RAW compression unit 113 has notified the setting parameter generation unit 311 of correlation information indicating "there is a correlation" for both of the picture 1 and the picture 2.

In the RAW compression unit 113, the quantization unit 302 executes the quantization processing using the first setting parameter provided from the setting parameter selection unit 314, and the encoding unit 303 executes the encoding processing. Here, the correlation between the picture 3 to be encoded and the picture 2 has been lost because the scene change has occurred between the picture 2 and the picture 3. Therefore, at the time of encoding of the $region_0$ shown in FIG. 4A, there is a high possibility that the value of the difference $ERR_0$ between the target code amount $T_0$ and the amounts of generated code $S_0$ shown in FIG. 4B exceeds the threshold. In this case, the correlation determination unit 305 can determine that there is no correlation between the picture 2 and the picture 3 in accordance with the magnitude of $ERR_0$. When notified of "there is no correlation" by the correlation determination unit 305 with respect to the $region_0$, the quantization control unit 304 executes the quantization control for the next $region_1$ and the subsequent regions by setting a quantization parameter so that code amounts allocated to the subbands HH, LH, and HL of the same Lv are even, similarly to the second setting parameter. As described above, a new setting parameter can be generated based on the notified first setting parameter. In this manner, even for a picture that immediately succeeds the scene change, the first setting parameter can be switched to the second setting parameter in the middle of the compression encoding processing.

In executing the compression encoding 603 with respect to the next picture 4, the RAW compression unit 113 notifies the setting parameter selection unit 314 of correlation information related to the picture 3 to which the compression encoding processing has been applied most recently. As this correlation information indicates "there is no correlation," the setting parameter selection unit 314 does not select the first setting parameter calculated based on an encoding result of the picture 2, and notifies the RAW compression unit 113 of the second setting parameter. In this case, as the RAW compression unit 113 is notified of the second setting parameter that is independent of the input images, certain code amount controllability and image quality can be achieved. Because the processing of the setting parameter selection unit 314 is extremely light as described above, it can be executed in an extremely short period, specifically, approximately the blanking period of the image sensor.

In executing the compression encoding 603 with respect to the next picture 5, the RAW compression unit 113 notifies the setting parameter selection unit 314 of correlation information related to the picture 4 to which the compression encoding processing has been applied most recently. As this picture is treated as the equivalent of the top picture due to the use of the second setting parameter, this correlation information indicates "there is a correlation." However, as the correlation information related to the immediately preceding picture 3 indicates "there is no correlation," the setting parameter selection unit 314 does not select the first setting parameter calculated based on an encoding result of the picture 3, and notifies the RAW compression unit 113 of the second setting parameter. This is because there is a possibility that the processing executed by the RAW compression unit 113 for the picture 3 is unstable.

As described above, the image capturing apparatus can be provided that can achieve certain code amount controllability and image quality while recording RAW moving images using a configuration that directly compresses and encodes RAW images that have been captured by the image sensor and are expected to achieve the advantageous effect of band reduction, even if the scene change occurs.

Although the second setting parameter is generated by the setting parameter generation unit 311 on a picture-by-picture basis in the foregoing description of the embodiment, the embodiment may adopt a configuration in which the second setting parameter generated for the top picture is continuously used for the second picture and the subsequent pictures. The scope of the invention also covers a configuration in which the setting parameter generation unit 311 stores a table containing fixed values, and the second setting parameter is generated without calculation by selecting one of the values contained in the table in accordance with an encoding result.

Although the first setting parameter storage unit 312 and the second setting parameter storage unit 313 are included in the encoding control unit in the foregoing description of the embodiment, the first setting parameter storage unit 312 and the second setting parameter storage unit 313 may be provided on a DRAM. The scope of the invention also covers a configuration in which the setting parameter selection unit notifies the RAW compression unit 113 of the address on the DRAM where the first setting parameter or the second setting parameter is stored, and the RAW compression unit 113 executes processing by reading in each setting parameter from the DRAM.

Second Embodiment

Figure 9A:
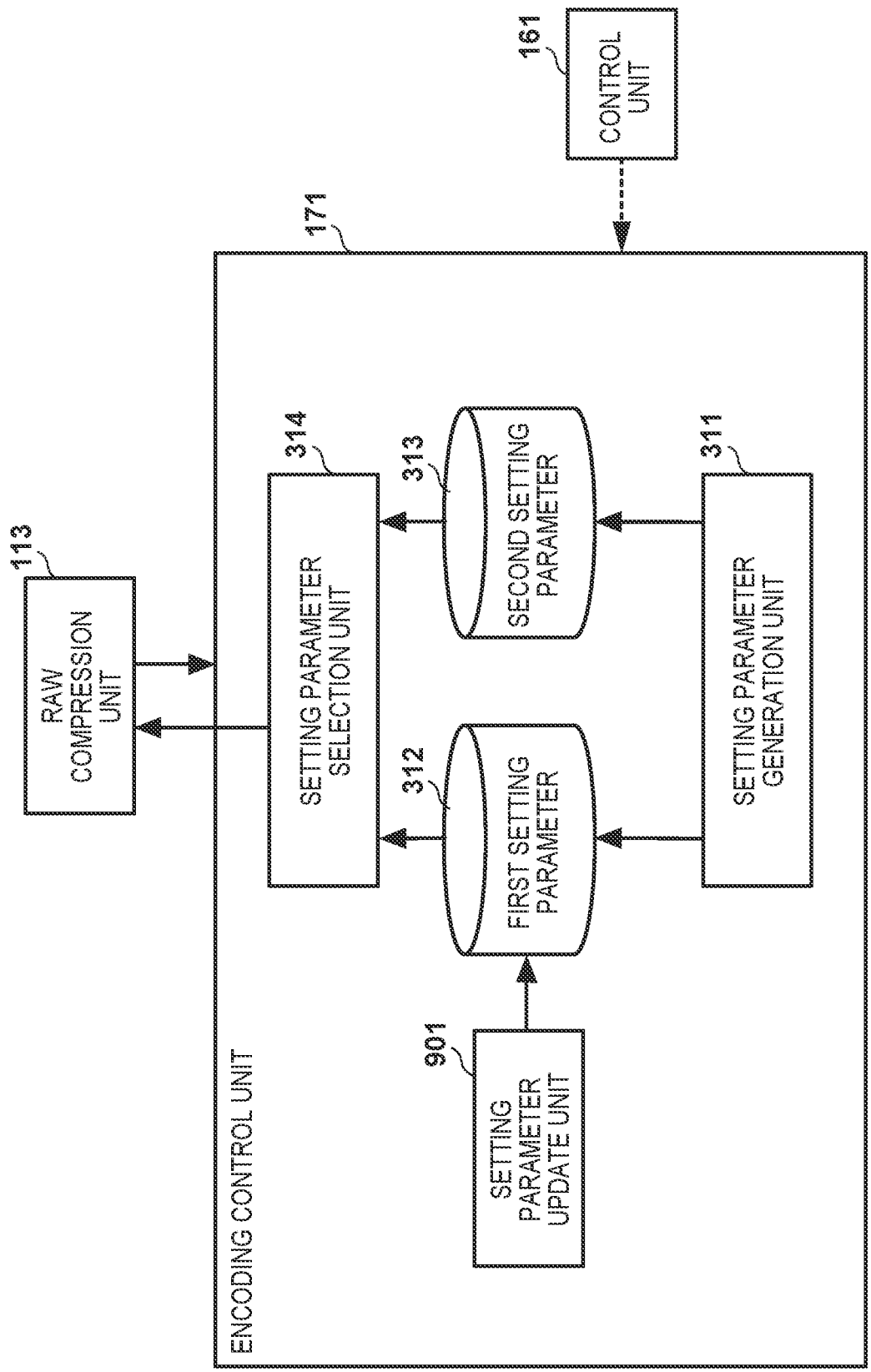
FIG. 9A is a block diagram showing an exemplary configuration of the encoding control unit 171 according to a second embodiment of the invention.

FIG. 9A is a block diagram showing an exemplary configuration of the encoding control unit 171 according to a second embodiment of the invention. In the embodiment, the encoding control unit 171 includes a setting parameter update unit 901 in addition to the components according to the first embodiment. The setting parameter update unit 901 updates a part of the first setting parameter in accordance with an encoding result in the RAW compression unit 113, and the setting parameter selection unit 314 notifies the RAW compression unit 113 of the updated first setting parameter. As other blocks are configured similarly to their counterparts in the first embodiment, a description thereof will be omitted.

Figure 9B:
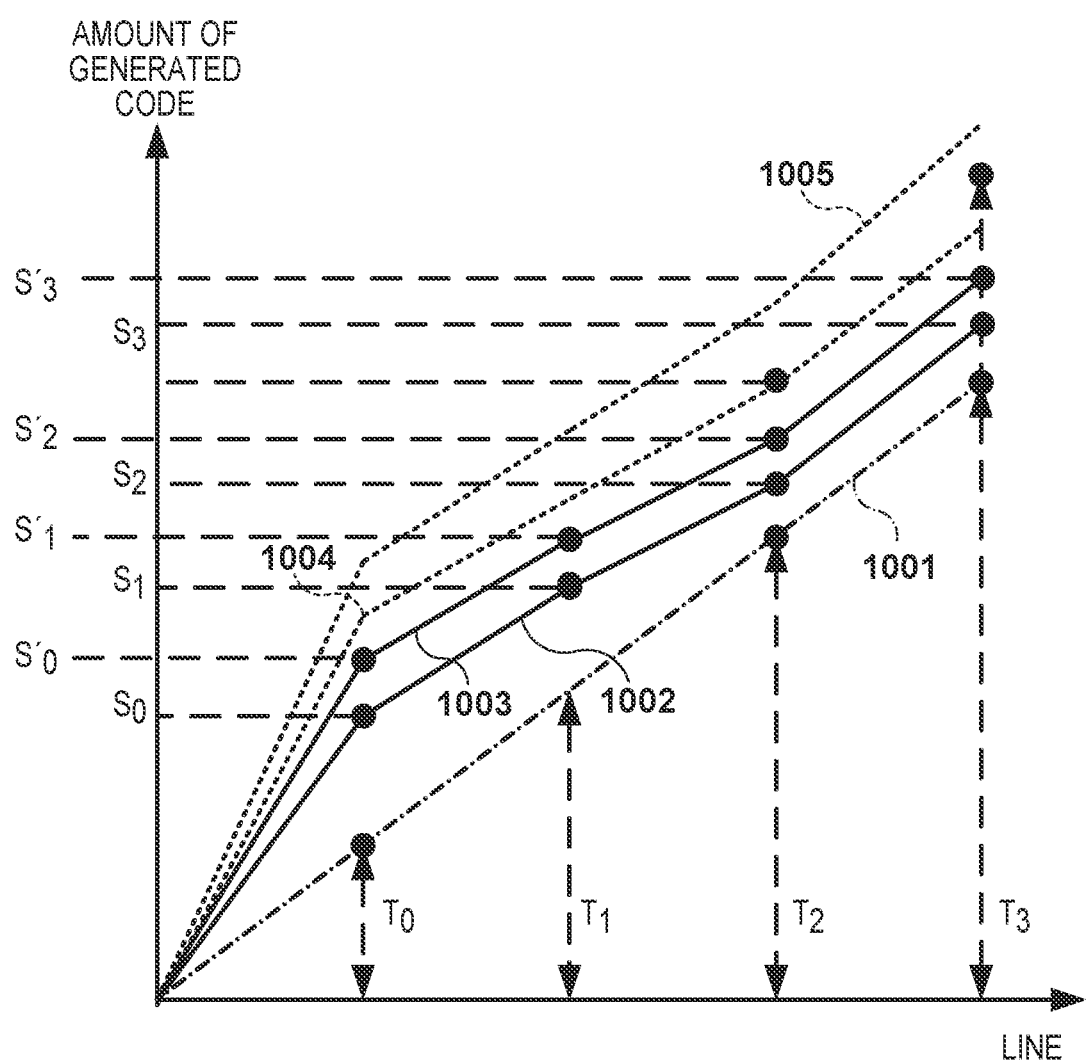
FIG. 9B shows a relationship among target code amounts, amounts of generated code, and thresholds used in determining a correlation within a screen according to the second embodiment of the invention.

FIG. 9B shows a relationship among target code amounts, amounts of generated code, and thresholds used in determining a correlation for a case in which the same target code amounts are set for a picture N to be encoded and a picture N−1 that immediately precedes the picture N to be encoded. The following describes an exemplary case in which the target code amounts are fixedly set for the respective regions in each picture. Alternatively, the set target code amounts may be weighted for the respective regions, similarly to the first embodiment. Regarding the processing of the correlation determination unit 305, the following describes only the determination made when the amount of encoding applied to the picture N is larger than the amount of encoding applied to the picture N−1.

A dot-and-dash line 1001 indicates a total target code amount in each region in each picture, and presents a result of calculating values of the total target code amounts $T_0$ to $T_3$ for the four regions from the top region. Here, the target code amounts allocated to the regions are even, as stated earlier. A solid line 1002 indicates a total amounts of generated code in each region in a picture N−2, which is two pictures ahead of the picture N to be encoded, and presents values of the total amounts of generated code $S_0$ to $S_3$ for the four regions from the top region. A solid line 1003 indicates a total amount of generated code in each region in the picture N−1, which immediately precedes the picture N to be encoded, and presents values of the total amounts of generated code $S'_0$ to $S'_3$ for the four regions from the top region. A dot line 1004 indicates thresholds that are used by the correlation determination unit 305 in determining a correlation; these thresholds are calculated based on the total amounts of generated code 1002 in the regions in the picture N−2, which is two pictures ahead of the picture N to be encoded. A dot line 1005 indicates thresholds that are used by the correlation determination unit 305 in determining a correlation; these thresholds are calculated by the setting parameter update unit 901 based on the total amounts of generated code 1003 in the regions in the picture N−1, which immediately precedes the picture N to be encoded.

To determine a correlation between pictures, the correlation determination unit 305 uses the thresholds calculated based on the total amounts of generated code in the regions in the pictures, and compares the thresholds with the amounts of generated code; it determines that "there is no correlation" if the amounts of generated code are larger than the thresholds, and determines that "there is a correlation" otherwise. To determine a correlation on a region-by-region basis, the thresholds may be compared with the amounts of generated code on a region-by-region basis. To determine a correlation on a picture-by-picture basis, a region-by-region determination result may be used as the basis, or the thresholds may be compared with the total amounts of generated code after encoding has been completed for all regions.

Similarly to the first embodiment, the setting parameter generation unit 311 according to the embodiment needs to generate setting parameters for the picture N while encoding the picture N−1 that immediately precedes the picture N to be encoded. At this time, an encoding result of the picture N−2, which is two pictures ahead, can be used. Therefore, the thresholds 1004 calculated by the setting parameter generation unit 311 are based on the total amounts of generated code 1002 in the regions, that is to say, the encoding result of the picture N−2, which is two pictures ahead.

However, when the total amounts of generated code tend to increase on a picture-by-picture basis as shown in FIG. 9B, it is necessary to set the thresholds based on a picture that is as close as possible to the picture to be encoded. If the thresholds 1004 are set based on the picture N−2 as described above, it could possibly be determined that "there is no correlation" as the total amounts of generated code in the picture N may exceed the thresholds 1004. A continuous change in the amounts of generated code between pictures, as seen in this example, can be considered as a change between pictures of the same scene that normally have a correlation with each other; thus, the thresholds should be set so as to be able to distinguish between a change in the amounts of generated code caused by a continuous change between frames of the same scene and a sudden change in the amounts of generated code caused by the scene change.

In view of this, in the embodiment, the setting parameter update unit 901 obtains an encoding result of the picture N−1 that immediately precedes the picture N to be encoded, calculates the thresholds 1005 based on the total amounts of generated code 1003 in the regions in the picture N−1, and updates threshold settings to be used by the correlation determination unit 305 among the first setting parameter. After the RAW compression unit 113 has completed the compression encoding processing 603 shown in FIG. 8, the encoding control unit 171 is notified of the encoding result, and the thresholds are updated before the setting parameter selection unit 314 executes the setting parameter selection processing 605. In this way, the thresholds of the first setting parameter of which the RAW compression unit 113 is notified are set based on the total amounts of generated code in the picture N−1 that is encoded immediately before the picture N to be encoded; therefore, the thresholds can be set with higher precision.

Regarding the processing of the correlation determination unit 305 according to the embodiment, the foregoing has described only the determination made when the code amount is large compared with a previous picture. However, as it is still desirable that the thresholds used in determining a correlation between pictures be based on a picture encoding result that is as recent as possible, the same concept applies also to a case in which the amounts of generated code decrease. Furthermore, the thresholds may be set consistently based on the amounts of generated code of an immediately preceding picture regardless of the tendency in the change in the amounts of generated code.

As described above, the image capturing apparatus can be provided that can increase the determination precision when the scene change has occurred and achieve certain code amount controllability and image quality more reliably while recording RAW moving images using a configuration that directly compresses and encodes RAW images that have been captured by the image sensor and are expected to achieve the advantageous effect of band reduction.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-231850, filed Nov. 29, 2016, which is hereby incorporated by reference herein in its entirety.

What is claimed is:

1. An image capturing apparatus, comprising:
an image capturing unit configured to generate an image by shooting a subject;
an encoding unit configured to generate encoded data by encoding the image shot by the image capturing unit; and
an encoding control unit configured to calculate a parameter for image encoding performed by the encoding unit, and provide the parameter to the encoding unit wherein while the encoding unit is generating encoded data of a first image to be encoded, the encoding control unit calculates a first parameter for encoding a second image to be encoded next based on an encoding result of a third image that has been encoded immediately before the first image, and
in a period from completion of encoding of the first image by the encoding unit to a start of encoding of the second image by the encoding unit, the encoding control unit provides one of the first parameter and a second parameter to the encoding unit as a parameter for encoding the second image based on a correlation between the first image and the third image, wherein the first parameter being calculated based on the encoding result of the third image, and the second parameter being independent of the encoding result of the third image.

2. The image capturing apparatus according to claim 1, wherein
the encoding unit includes a determination unit configured to determine the correlation between the first image and the third image, and
the encoding control unit
selects the first parameter when it is determined that there is a correlation between the first image and the third image, and
selects the second parameter when it is determined that there is no correlation between the first image and the third image.

3. The image capturing apparatus according to claim 2, wherein
the determination unit determines the correlation based on comparison between amounts of generated code in an encoding result of the first image and amounts of generated code in the encoding result of the third image.

4. The image capturing apparatus according to claim 3, wherein
the determination unit determines the correlation using a threshold that has been set by the encoding control unit based on the amounts of generated code in the encoding result of the third image.

5. The image capturing apparatus according to claim 3, wherein
the determination unit determines the correlation using a threshold that has been set by the encoding control unit based on amounts of generated code in an encoding result of a fourth image that has been encoded immediately before the third image.

6. The image capturing apparatus according to claim 2, wherein
the encoding control unit includes, into the first parameter, a threshold for determining a correlation between the first image and the second image, and
the threshold is a value obtained by updating a value, which is calculated based on amounts of generated code in the encoding result of the third image, based on amounts of generated code in an encoding result of the first image.

7. The image capturing apparatus according to claim 2, wherein
when the determination unit has determined that there is a correlation at least twice in a row including the determination that there is a correlation between the first image and the third image, the encoding control unit selects the first parameter as the parameter for encoding the second image.

8. The image capturing apparatus according to claim 2, wherein
the encoding unit generates the encoded data by dividing the first image into a plurality of regions and encoding respective regions in series,
the determination unit further determines correlations for respective regions between the first image and the third image based on encoding results that have been obtained for the respective regions, and
when the determination unit has determined that there is no correlation between the first image and the third image in the first region of the plurality of regions based on an encoding result that has been obtained from the first region using the first parameter, the encoding unit uses the second parameter for one or more regions to be encoded after the first region among the plurality of regions.

9. The image capturing apparatus according to claim 1, wherein
the encoding unit generates a plurality of subbands by applying wavelet transform to the image, and generates the encoded data for the respective subbands.

10. The image capturing apparatus according to claim 9, wherein
the first parameter includes target code amounts that have been allocated to the respective subbands in accordance with a result of image encoding performed by the encoding unit, and
the second parameter includes target code amounts that are evenly allocated to the plurality of subbands of the same decomposition level.

11. The image capturing apparatus according to claim 1, further comprising
a buffer which temporarily stores the encoded data, wherein
the image shot by the image capturing unit is input to the encoding unit without going through the buffer.

12. The image capturing apparatus according to claim 1, wherein
each of the first image, the second image, and the third image is a RAW image.

13. An image processing method, comprising:
  generating encoded data by encoding an image that has been created by shooting a subject; and
  calculating a parameter for encoding the image, and providing the parameter for the purpose of generating the encoded data, wherein
  while encoded data of a first image to be encoded is being generated in the generating, a first parameter for encoding a second image to be encoded next is calculated based on an encoding result of a third image that has been encoded immediately before the first image, and
  in a period from completion of encoding of the first image in the generating to a start of encoding of the second image in the generating, one of the first parameter and a second parameter is provided as a parameter for encoding the second image based on a correlation between the first image and the third image, wherein the first parameter being calculated based on the encoding result of the third image, and the second parameter being independent of the encoding result of the third image.

14. A non-transitory computer-readable storage medium storing a program that, when executed by a processor of an image capturing apparatus, causes the processor to perform an image processing method, the method comprising:
  generating encoded data by encoding an image that has been created by shooting a subject; and
  calculating a parameter for encoding the image, and providing the parameter for the purpose of generating the encoded data, wherein
  while encoded data of a first image to be encoded is being generated in the generating, a first parameter for encoding a second image to be encoded next is calculated based on an encoding result of a third image that has been encoded immediately before the first image, and
  in a period from completion of encoding of the first image in the generating to a start of encoding of the second image in the generating, one of the first parameter and a second parameter is provided as a parameter for encoding the second image based on a correlation between the first image and the third image, wherein the first parameter being calculated based on the encoding result of the third image, and the second parameter being independent of the encoding result of the third image.

* * * * *